United States Patent [19]

Pence et al.

[11] 3,728,770

[45] Apr. 24, 1973

[54] APPARATUS FOR ENSURED SPLICING OF WIRES

[75] Inventors: Albert L. Pence; Van Zandt Smith, both of Austin, Tex.

[73] Assignee: A.P.C. Industries, Inc., Mineral Wells, Tex.

[22] Filed: May 18, 1972

[21] Appl. No.: 254,430

Related U.S. Application Data

[62] Division of Ser. No. 93,107, Nov. 27, 1970.

[52] U.S. Cl. ............................................29/203 D
[51] Int. Cl. .............................................H01r 43/04
[58] Field of Search ...................29/203 D, 203 R, 29/203 DT, 203 P

[56] References Cited

UNITED STATES PATENTS 2,668,950  2/1954  Bohaboy et al..................29/203 D
3,559,698  2/1971  Smith..............................140/105

Primary Examiner—Thomas H. Eager
Attorney—Wooford and Felsman

[57] ABSTRACT

Apparatus for splicing conductors characterized by inserting the conductors to be spliced within a crimpable connector means, passing penetrating radiation through the connector means and conductors, monitoring a quantum level of a function that is responsive to the attenuation of the penetrating radiation and crimping the connector means to join the conductors only if the penetrating radiation is attenuated an amount sufficient to indicate proper insertion of the conductors, indicated by the quantum level of the function being in a predetermined scalar direction from a predetermined level. Also disclosed are specific types of penetrating radiation; for example, energy and nuclear particles; and specific structures.

22 Claims, 6 Drawing Figures

Patented April 24, 1973

3,728,770

APPARATUS FOR ENSURED SPLICING OF WIRES

This application is a division of application Ser. No. 93,107, filed Nov. 27, 1970.

BACKGROUND OF THE INVENTION

1. Field of the Invention

This invention pertains to joining of conductors such as wires. More particularly, this invention relates to apparatus for ensuring that wires are satisfactorily joined together, or spliced, to effect a continuous electrical conductor. 2. Description of the Prior Art Many methods and apparata have been tried to facilitate joining of wires in diverse environments such as in airplane wiring, ship wiring and telephone cables. Telephone cables, particularly, often contain hundreds of conductor pairs, or wires. It is frequently necessary to splice such cables. Until recently, such splicing has been done manually with hand tools; which was a difficult, tedious and slow procedure. There has been recently developed apparatus for splicing such cables wherein connectors are fed to a powered portable cable splicer tool having a feed mechanism and a crimping mechanism such that an operator inserts the pair of wires to be spliced into respective connectors, or connector means, and then actuates a power mechanism; which causes the apparatus to automatically crimp the connector, advance the feed and eject the crimped connector. A further improved portable device is described in U.S. Pat. No. 3,559,698, issued Feb. 2, 1971, entitled "Cable Splicer Tool" by Van Z. Smith, and assigned to the assignee of the present invention. Frequently, the emergency conditions require working in poor visibility or in cold where the sense of touch is numbed, or otherwise under conditions where the degree of insertion of the wires within the connector is difficulty ascertainable. Because the apparatus for crimping the connector around the wires is new, the prior art has not, of course, provided a solution to the problem of ascertaining that the wires are properly inserted before the connectors are crimped.

DESCRIPTION OF PREFERRED EMBODIMENTS

It is an object of this invention to provide method and apparatus which obviates the defects of the prior art devices for splicing conductors; and, specifically, to provide method and apparatus that ensures that wires are properly inserted within a crimpable connector means and crimping the connector means about the wires only after they are properly inserted, thereby forming a continuous electrical conductor in a splice.

Figure 1:
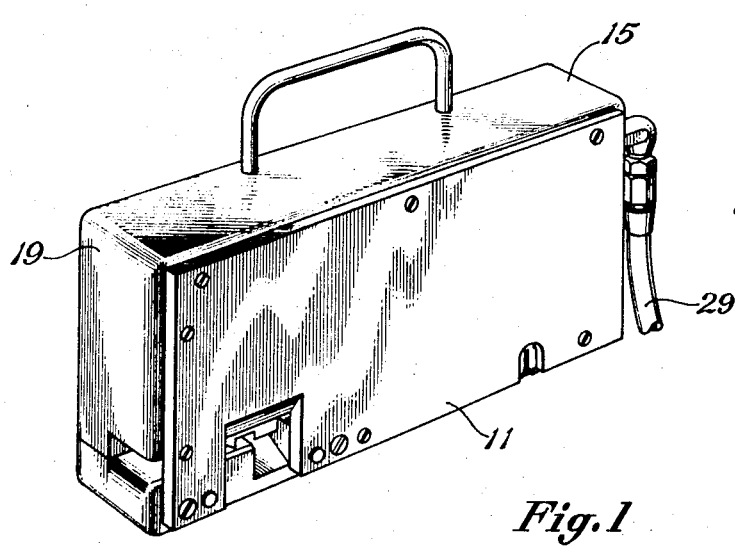
FIG. 1 is an isometric view of automatic crimping apparatus in accordance with one embodiment of this invention.
Figure 2:
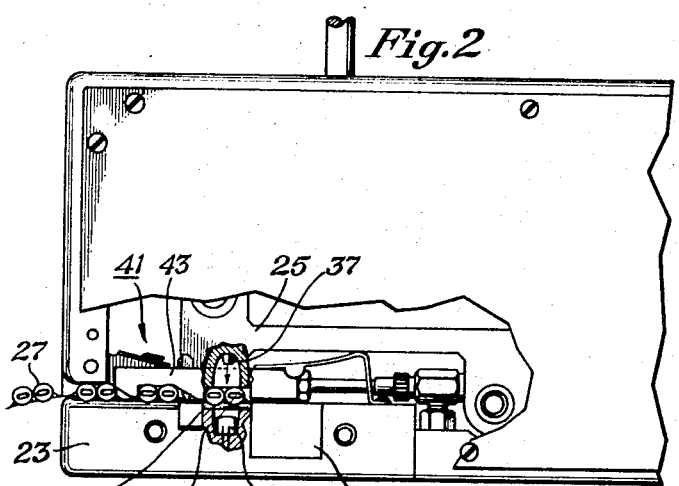
FIG. 2 is an enlarged partial side elevational view, partly cutaway and partly in section, illustrating the embodiment of FIG. 1.

Referring to the drawings, a cable splice tool, in accordance with a preferred embodiment of this invention, includes a housing having a front side plate 11, a rear plate (not shown), a top closure 15, a bottom closure (not shown), a forward or feed end closure 19 and an opposite end closure (not shown). The cable splicer tool, per se, is described in the patent application Ser. No. 746,510, referenced hereinbefore, and need not be described in detail herein. Basically, the cable splicer tool has a feed table 23, FIG. 2, having a general form of a rectangular box with sides abutting the inner surfaces of the side plates such as plate 11. The feed table 23 defines an anvil means such as anvil 31. The crimping tool also has a hammer means such as hammer 25. The hammer 25 is moved downwardly to crimp a connector means, such as connectors 27, about wires inserted into the open end thereof when the connector is moved intermediate the hammer 25 and the anvil 31. Expressed otherwise, the feed table 23 defines a path of travel for the connectors 27; and, with the remainder of the cable splicing tool defines an insertion location 42 intermediate the hammer 25 and the anvil 31 wherein wires are inserted into the connectors. A connector feed mechanism 41 employing a feed pawl 43 effects respective advancement of the connectors to the insertion location and thence to an ejector chute 45. The connector feed mechanism 41 operates conjointly and inversely with the hammer 25 to expedite the splicing operation. Motive power to operate the connector feed mechanism 41 and hammer 25 may be supplied by suitable piston, cylinder and shaft arrangement and powered through a fluid supplied through a hose 29, FIG. 1. As described in the copending patent application Ser. No. 746,510, the piston is preferably of the double acting type and effects downward movement of hammer 25 in response to a suitable control such as a foot or knee control operable by the repairman making the splice.

Figure 3:
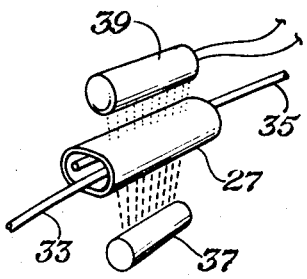
FIG. 3 is a schematic view of one embodiment of this invention wherein the source means is employed below an insertion location, as in an anvil means of the embodiment of FIG. 1.
Figure 4:
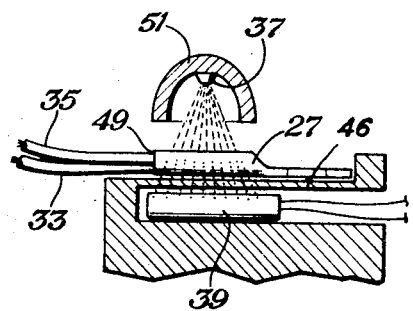
FIG. 4 is a partial cross sectional view, partly schematic, illustrating a source means disposed above an insertion location, as in a hammer means of the embodiment of FIG. 1.

The connectors 27 may take any suitable form. For example, as illustrated in FIG. 3, the connectors 27 may have both ends open whereby wires 33 and 35 may be inserted from both ends. On the other hand, the connectors 27 may have a single open end, as illustrated in FIG. 4, wherein both wires are inserted from the open end. Ordinarily, the connectors 27 will have a conductive inner surface such as of copper-beryllium alloy for ensuring that electrical conductivity is continuous through the splice. The outer surface of the connector 27 may be enclosed in a nonconductive means, if desired.

To ensure that the wires are inserted far enough into the connectors 27, a source means 37 is disposed adjacent the insertion location for passing penetrating radiation through the connector 27 and the wires inserted thereinto. If the wires are insufficiently inserted within the connectors 27, the degree of attenuation of the penetrating radiation is below a minimum predetermined satisfactory amount. Conversely, if the wires are sufficiently inserted the degree of attenuation of the penetrating radiation will be above the minimum predetermined satisfactory amount. The source means may be a source emitting penetrating radiation energy such as gamma ray or X-ray or it may be a source emitting nuclear particles such as neutrons. Preferably, the source means is a small encapsulated radioactive source emitting either gamma rays or neutrons. Such gamma- or neutron-emitters, or sources, are well known and are widely employed in well logging apparatus for measuring the lithographic character of subterranean formations. Sources of gamma rays and neutrons are commercially available for use under the auspices of the Atomic Energy Commission. For example, encapsulated sources of strontium 90 are widely employed for emitting gamma rays. Neutron emitting sources will not be employed when they induce radioactivity of sufficient intensity and half-life to constitute a safety hazard.

A detector means is disposed adjacent the insertion location for determining a quantum level of a function that is responsive to the degree of attenuation of the penetrating radiation passed through the connector means and the wires. Ordinarily, the detector means is disposed on the side of the insertion location opposite the source means for greatest sensitivity. If desired, however, the detector means may be placed on the same side or at another location appropriate to the type phenomena giving rise to the function being monitored. The function may be the penetrating radiation, per se, or a radiation energy induced by the radiation, as in the case of gamma ray emission induced by absorption of neutrons; as will become clear from the descriptive matter hereinafter. Specifically, the detector means may comprise a detector 39 such as a photomultiplier tube that is responsive to the gamma rays passing from the respective connectors 27. If a source emitting gamma rays is employed, the quantum level of gamma rays measured is inversely proportional to the degree of attenuation. Expressed otherwise, the lower the quantum level of gamma rays detected by the detector 39, the greater is the attenuation of the gamma rays emitted from the source 37. If, on the other hand, a source of nuclear particles such as neutrons is employed and the neutrons pass through the connector 27 and the wires, the degree of gamma radiation detected by detector 39 is directly proportional to the attenuation of the neutrons. Expressed otherwise, the greater the absorption of neutrons; and, consequently, the greater the attenuation; the greater will be the quantum level of gamma rays detected, since the gamma rays are emitted in response to the absorption of the neutrons by the connectors and the wires. If desired, the detector 39 may comprise a crystal means; such as, alkali metal iodide like lithium iodide or sodium iodide; that has an affinity for absorbing neutrons and that is responsive to the quantum level of neutrons passing through the connectors 27 and the wires. In such an event, the quantum level of neutrons detected will be inversely proportional to the degree of attenuation, as described hereinbefore with respect to gamma rays from a gamma ray emitting source 37.

A plurality of arrangements of the source means and the detector means is possible depending upon the objectives sought. For example, as illustrated in FIG. 3, the source means 37 may be emplaced in the anvil 31 below the connector 27. In such an event, the detector 39 is emplaced in the hammer 25 above the connector 27. Expressed otherwise, the source means 37 may be emplaced below and detector 39 may be emplaced above the insertion location where the wires will be inserted into the connector 27.

On the other hand, as illustrated in FIG. 4, the source 37 may be disposed in the hammer 25, or above the insertion location, whereas the detector 39 is disposed in the anvil means or below the insertion location. For the safety of the operator inserting the wire; for example, wires 33 and 35 inserted into the open end 49 in FIG. 4; the source means 37 is collimated by a heavy metal shielding 51. The heavy metal shielding is ordinarily lead.

The source means 37 and the detector 39 may be employed within matching recesses that are aligned and open for greatest sensitivity. The openings are, of course, smaller than the connectors 27 in order not to interfere with the crimping of the connectors about the wires. If desired, one or more layers of material such as layer 46, FIG. 4, may provide a continuous surface in either or both the hammer 25 and the anvil 31 for crimping the connectors 27. The open recesses increase the sensitivity of the detection of improper insertion. That is, the attenuation due to the layer may be larger than that due to the wire so that the percentage of attenuation effected by proper insertion is lessened, with consequent lower sensitivity in the presence of the layer. The source means 37 and the detector 39 may be emplaced at locations other than on opposite sides of the insertion location if the function being monitored is not of the penetrating radiation per se; but is, instead, a function that is responsive to the attenuation of the radiation in the connector 27 and the conductors therewithin.

For a high degree of sensitivity, the source means 37 may be highly collimated and emplaced so as to pass the penetrating radiation through the end 53 opposite the open end 49 and to a detector. In this way, the penetrating radiation is attenuated only if the wires 33 and 35 are substantially completely inserted such that their ends go to the opposite end 53. This apparatus with the narrowly collimated source 37 is also advantageous from a safety point of view, since the operator is less likely to receive any radiation from the source. If desired, of course, the operator may wear suitable protective clothing such as lead lined gloves and lead lined apron. Ordinarily, such protective clothing will not be necessary if the source means is properly collimated and properly designed for the application.

Figure 6:
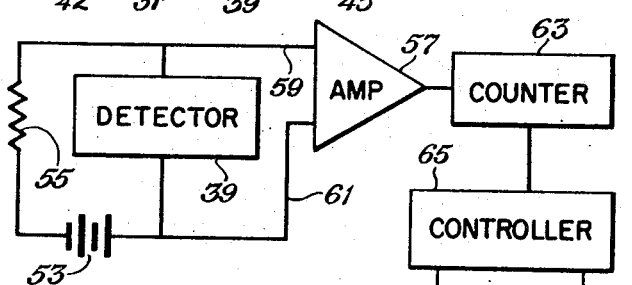
FIG. 6 is a schematic view in the form of a block diagram, showing one embodiment of this invention.
Figure 5:
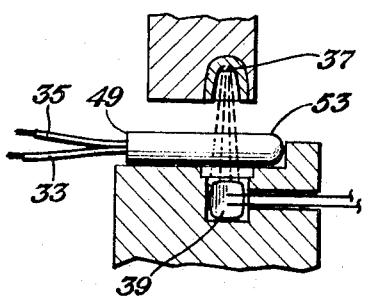
FIG. 5 is a partial cross sectional view, partly schematic, illustrating a highly sensitive embodiment of this invention employing a highly collimated source means.

An evaluation means is connected with the detector means for determining when the penetrating radiation has been attenuated an amount sufficient to indicate proper insertion of the wires; indicated by the quantum level of the function being monitored by the detector 39 being in a predetermined scalar direction; that is, above or below; a predetermined level. Referring to FIG. 6, a power source 53, resistor 55 and detector 39 are serially connected. The output terminals of the detector 39 are serially connected with amplifier 57 via conductors 59 and 61. The amplifier 57 amplifies the weak signals from detector 39 to a level compatible with a portion of the evaluation means such as counter 63. Specifically, the amplifier 57 is serially connected with counter 63 to form an evaluation means for determining whether the rate signals from detector 39 are above or below a predetermined level. The counter 63 may be a logic counter such as a ring counter or it may convert the incoming impulses into a direct current (DC) output. It may be pre-set to count over a predetermined time interval. If the counter is a ring counter a given logic element may also serve as a decision element to indicate the quantum level detected by the detector is above a predetermined level, or rate. If the counter has a DC output, the DC output may be applied to capacitor that is sampled at the end of the time period; or the DC output can be employed to operate a simple indicator such as a DC volt meter. These types of evaluation means are known; do not, per se, comprise a part of this invention; and need not be described in detail herein. They are, in fact, commercially available. Since frequently visibility is restricted such that the DC volt meter may be difficulty visible, it is frequently advantageous to connect the counter to the controller, as illustrated. The controller 65 is connected with an alarm signal means; such as, a light giving a visual apprisal or a horn giving an audio apprisal; to apprise the operator when inadequate insertion of the wire has been effected. The controller 65 is also connected to an inhibit control which will prevent operation of the splicing tool until satisfactory wire insertion has been effected. The inhibit control may comprise an electrically operable solenoid valve in the line 29 or any other conventional inhibitor which will prevent operation of the hammer to crimp the connector 27 until the proper insertion of the wires has been effected.

The operation of the cable splicing tool will be described with respect to joining pairs of telephone conductors although, as indicated, the principle is the same regardless of the system in which the conductors are to be joined.

The operator inserts a clip of connectors 27; such as, a tape containing a plurality of lineally spaced connectors as described in the aforementioned copending application Ser. No. 746,510; and effects operation of the cable splicing device until a connector is advanced to the insertion location 42. The operator now inserts two end portions of the conductor to be spliced in the respective conductor receiving cavities of the connector under the hammer 25 at the insertion location 42. He then actuates the control valve by his appropriate control; such as, the foot control or knee control. If satisfactory insertion of the wires has been effected, the hammer 25 will be moved downwardly to crimp the connector 27 about the conductors, or wires. If the source means 37 emits gamma rays and a photomultiplier tube is employed as the detector 39, the small photon excitation emitted by the crystal in the photomultiplier tube 39 will be picked up by a light responsive element and small electrical signals sent via conductors 59 and 61 to amplifier 57. The signals are amplified in amplifier 57 and are counted in counter 63. The counter 63, as part of the evaluation means, determines when the quantum level of gamma radiation sensed by detector 39 is below a desired predetermined level, and if so the controller 65 allows the cable splice tool to operate and crimp the connector 27 about the wires. If, on the other hand, the quantum level of gamma radiation sensed by the detector 39 is above the predetermined level, indicating that the wires have not been properly inserted within the connector 27, the controller 65 inhibits operation of the cable splice tool and warns the operator. The operator corrects the insertion. The cable splice tool then crimps the connector about the wires.

If desired, the controller 65 may inhibit the operation of the cable splice tool without effecting an appropriate alarm signal, since the operator will be apprised of incorrect insertion of the wires by the failure of the cable splice tool to operate.

In fact, the combination of source means, detector means, and evaluation means may be employed as a quality control instrument. When operated as a quality control instrument, the connector is crimped about the conductor and then the degree of insertion of the conductor ends is determined as described hereinbefore. If the insertion is inadequate, the crimped connector is removed and the splicing repeated.

While a specific type of cable splice tool has been described herein and the operation of the invention described specifically in relation thereto, any suitable cable splice tool may be employed. The principle of the invention remains the same. Basically, the invention envisions method and apparatus of joining conductors such as wires by inserting the conductors within a crimpable connector means, passing penetrating radiation through the connector means and the conductors, monitoring a quantum level of a function that is responsive to the degree of attenuation of the penetrating radiation; which, in turn, determines the degree of insertion of the wires; and ensuring that proper insertion of the wires has been effected before finally accepting the splice formed by crimping the connector means about the wires. The term quantum level is employed herein in its dictionary definition sense to indicate a quantity per unit time, or rate, rather than its physics definition of energy level of a discrete quanta.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. Apparatus for joining conductors comprising:
   a. crimping means for crimping a connector means about a plurality of conductors; said crimping means also defining a path of travel of said connector means and defining an insertion location where said conductors are inserted into said connector means;
   b. collimated source means disposed adjacent said insertion location for passing penetrating radiation through said connector means and said conductors;
   c. detector means disposed adjacent said insertion location for monitoring a quantum level of a function that is responsive to the attenuation of said penetrating radiation passing through said connector means and said conductors; and d. evaluation means connected with said detector means for determining when said penetrating radiation has been attenuated an amount sufficient to indicate satisfactory insertion of the conductors, as indicated by said quantum level of said function monitored by said detector means being in a predetermined scalar direction from a predetermined level.

2. The apparatus of claim 1 wherein said source means and said detector means are disposed respectively on opposite sides of said insertion location.

3. The apparatus of claim 2 wherein said crimping means has an anvil means and a hammer means for effecting said crimping of said connector means; said source means is disposed in said anvil means below said insertion location and said detector means is disposed in said hammer means above said insertion location.

4. The apparatus of claim 2 wherein said crimping means has an anvil means and a hammer means; said source means is disposed in said hammer means above said insertion location and said detector means is disposed in said anvil means below said insertion location.

5. The apparatus of claim 1 wherein said evaluation means is connected with a controller means that inhibits operation of said crimping means until said quantum level of said function monitored by said detector means is in said predetermined scalar direction from said predetermined level.

6. The apparatus of claim 1 wherein said evaluation means is connected with a controller means and an alarm means is connected with said controller means for apprising an operator when said quantum level of said function monitored by said detector means is in said predetermined scalar direction from said predetermined level, as by failure to have said conductors inserted far enough within said connector means.

7. The apparatus of claim 1 wherein said crimping means defines said insertion location such that conductors can be inserted in each end of said connector means.

8. The apparatus of claim 1 wherein said crimping means defines said insertion location such that said conductors are insertable in only one end of said connector means.

9. The apparatus of claim 1 wherein said source means comprises a source of penetrating radiation energy and said detector means comprises a means for detecting the quantum level of the penetrating radiation energy passing through said connector means and said conductors.

10. The apparatus of claim 9 wherein said source means comprises a source of gamma rays; said detector means comprises a photomultiplier tube for detecting the quantum level of gamma rays passing through said connector means and said conductors; and said evaluation means comprises a counter means having means for indicating when a counting rate above said predetermined level is effected.

11. The apparatus of claim 1 wherein said source means comprises a source of nuclear particles and said detector means comprises a means for detecting the quantum level of energy emitted in response to absorption of said nuclear particles by said connector means and said conductors.

12. The apparatus of claim 1 wherein said source means comprises a source of nuclear particles, and said detector means comprises a means for detecting the nuclear particles passing through said connector means and said conductors.

13. The apparatus of claim 1 wherein said crimping means has an anvil means and a hammer means for effecting crimping of said connector means and said source means; and said source means is disposed in said anvil means.

14. The apparatus of claim 1 wherein said crimping means has an anvil means and a hammer means for effecting crimping of said connector means; and said source means is carried by said hammer.

15. Apparatus for joining conductors comprising:
a. connector means having an open end for insertion of conductors and a closed end for limiting insertion of said conductors;
b. crimping means for crimping said connector means about a plurality of conductors; said crimping means defining a path of travel for said connector means and defining an insertion location where said conductors are inserted into said connector means through said open end;
c. source means disposed adjacent said insertion location and said closed end of a connector means in place at said insertion location; collimation means narrowly collimating said source means and for passing penetrating radiation through only said closed end of said connector means for greater sensitivity, so that said conductors have to be inserted completely into said opposite end to attenuate said penetrating radiation a sufficient amount;
d. detector means disposed adjacent said insertion location and said closed end of said connector means in place thereat for monitoring a quantum level of a function that is responsive to the attenuation of said penetrating radiation passing through said closed end of said connector means and any conductors therein; and
e. evaluation means connected with said detector means for determining when said penetrating radiation has been attenuated an amount sufficient to indicate satisfactory insertion of the conductors, as measured by said quantum level of said function monitored by said detector means.

16. The apparatus of claim 15 wherein said evaluation means is connected with a controller means that inhibits operation of said crimping means until said quantum level of said function monitored by said detector means is in a predetermined scalar direction from a predetermined level.

17. The apparatus of claim 15 wherein said evaluation means is connected with a controller means and an alarm means is connected with said controller means for apprising an operator when said quantum level of said function monitored by said detector means is in a predetermined scalar direction from said predetermined levle, as by failure to have said conductors inserted far enough within said connector means.

18. The apparatus of claim 15 wherein said crimping means has an anvil means and a hammer means; and said source means is disposed in said hammer means above said insertion location and said detector means is disposed in said anvil means below said insertion location.

19. The apparatus of claim 15 wherein said crimping means has an anvil means and a hammer means; and said source means is disposed in said anvil means below said insertion location and said detector means is disposed in said hammer means above said insertion location.

20. The apparatus of claim 15 wherein said source means comprises a source of penetrating radiation energy and said detector means comprises a means for detecting the quantum level of the penetrating radiation energy passing through said connector means and said conductors.

21. The apparatus of claim 20 wherein said source means comprises a radioactive source emitting gamma rays and said detector means comprises a photomultiplier tube for detecting the quantum level of gamma rays passing through said connector means and said conductors; and said evaluation means comprises a counter means having means for indicating when a counting rate above said predetermined level is effected.

22. The apparatus of claim 15 wherein said source means comprises a cource of neutrons and said detector means comprises a means for detecting the quantum level of gamma rays emitted in response to absorption of said neutrons by said connector means and said conductors; and said evaluation means comprises a counter means having means for indicating when a counting rate below said predetermined level is effected.

* * * * *